United States Patent
Paulus et al.

(10) Patent No.: US 10,909,157 B2
(45) Date of Patent: Feb. 2, 2021

(54) ABSTRACTION OF TEXT SUMMARIZATION

(71) Applicant: salesforce.com, inc., San Francisco, CA (US)

(72) Inventors: Romain Paulus, Menlo Park, CA (US); Wojciech Kryscinski, Palo Alto, CA (US); Caiming Xiong, Mountain View, CA (US)

(73) Assignee: salesforce.com, inc., San Francisco, CA (US)

( * ) Notice: Subject to any disclaimer, the term of this patent is extended or adjusted under 35 U.S.C. 154(b) by 52 days.

(21) Appl. No.: 16/051,188

(22) Filed: Jul. 31, 2018

(65) Prior Publication Data
US 2019/0362020 A1    Nov. 28, 2019

Related U.S. Application Data

(60) Provisional application No. 62/675,147, filed on May 22, 2018.

(51) Int. Cl.
*G06F 40/211*    (2020.01)
*G06F 40/30*    (2020.01)
(Continued)

(52) U.S. Cl.
CPC ........ *G06F 16/345* (2019.01); *G06F 16/3347* (2019.01); *G06K 9/629* (2013.01); *G06K 9/6256* (2013.01); *G06N 3/04* (2013.01)

(58) Field of Classification Search
CPC ...... G06F 17/27; G06F 17/20; G06F 17/2705; G06F 17/271; G06F 17/2715;
(Continued)

(56) References Cited

U.S. PATENT DOCUMENTS 9,460,088 B1 *   10/2016   Sak ..................... G10L 15/19
10,282,663 B2     5/2019   Socher et al.
(Continued)

OTHER PUBLICATIONS

Chen et al., An Examination of the CNN/DailyMail Neural Summarization Task, 2017, journal=Retrieved November,vol. 22, pp. 1-9. (Year: 2017).*

(Continued)

*Primary Examiner* — Lamont M Spooner
(74) *Attorney, Agent, or Firm* — Haynes and Boone, LLP

(57) ABSTRACT

A system is disclosed for providing an abstractive summary of a source textual document. The system includes an encoder, a decoder, and a fusion layer. The encoder is capable of generating an encoding for the source textual document. The decoder is separated into a contextual model and a language model. The contextual model is capable of extracting words from the source textual document using the encoding. The language model is capable of generating vectors paraphrasing the source textual document based on pre-training with a training dataset. The fusion layer is capable of generating the abstractive summary of the source textual document from the extracted words and the generated vectors for paraphrasing. In some embodiments, the system utilizes a novelty metric to encourage the generation of novel phrases for inclusion in the abstractive summary.

16 Claims, 7 Drawing Sheets

(51) Int. Cl.
  *G06F 16/00* (2019.01)
  *G06N 20/00* (2019.01)
  *G06F 16/34* (2019.01)
  *G06K 9/62* (2006.01)
  *G06N 3/04* (2006.01)
  *G06F 16/33* (2019.01)

(58) Field of Classification Search
  CPC .. G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775; G06F 17/278; G06F 17/2785; G06F 17/2795
  USPC .............................................................. 704/9
  See application file for complete search history.

(56) References Cited

U.S. PATENT DOCUMENTS

| | | | |
|---|---|---|---|
| 10,346,721 B2 | 7/2019 | Albright et al. | |
| 10,402,495 B1* | 9/2019 | Rush | G10L 15/197 |
| 10,445,356 B1* | 10/2019 | Mugan | G06F 16/334 |
| 2012/0108997 A1* | 5/2012 | Guan | A61B 5/0482 600/545 |
| 2016/0232440 A1* | 8/2016 | Gregor | G06N 3/04 |
| 2016/0350653 A1 | 12/2016 | Socher et al. | |
| 2017/0024645 A1 | 1/2017 | Socher et al. | |
| 2017/0032280 A1 | 2/2017 | Socher | |
| 2017/0046616 A1 | 2/2017 | Socher et al. | |
| 2017/0140240 A1 | 5/2017 | Socher et al. | |
| 2017/0228591 A1* | 8/2017 | Simske | G06F 16/9535 |
| 2018/0082171 A1 | 3/2018 | Merity et al. | |
| 2018/0096219 A1 | 4/2018 | Socher | |
| 2018/0114108 A1* | 4/2018 | Lao | G06N 3/0445 |
| 2018/0121787 A1 | 5/2018 | Hashimoto et al. | |
| 2018/0121788 A1 | 5/2018 | Hashimoto et al. | |
| 2018/0121799 A1* | 5/2018 | Hashimoto | G06F 40/216 |
| 2018/0129931 A1 | 5/2018 | Bradbury et al. | |
| 2018/0129937 A1* | 5/2018 | Bradbury | G06N 3/0445 |
| 2018/0129938 A1 | 5/2018 | Xiong et al. | |
| 2018/0143966 A1 | 5/2018 | Lu et al. | |
| 2018/0144208 A1 | 5/2018 | Lu et al. | |
| 2018/0144248 A1 | 5/2018 | Lu et al. | |
| 2018/0160200 A1* | 6/2018 | Goel | G10L 15/26 |
| 2018/0268287 A1 | 9/2018 | Johansen et al. | |
| 2018/0268298 A1 | 9/2018 | Johansen et al. | |
| 2018/0276525 A1* | 9/2018 | Jiang | G06F 16/3329 |
| 2018/0300317 A1 | 10/2018 | Bradbury | |
| 2018/0300400 A1* | 10/2018 | Paulus | G06N 3/08 |
| 2018/0336198 A1 | 11/2018 | Zhong et al. | |
| 2018/0336453 A1 | 11/2018 | Merity et al. | |
| 2018/0349359 A1 | 12/2018 | McCann et al. | |
| 2018/0349517 A1* | 12/2018 | Kleiman-Weiner | G06N 5/022 |
| 2018/0365220 A1* | 12/2018 | Chakraborty | G06N 3/0454 |
| 2018/0373682 A1 | 12/2018 | McCann et al. | |
| 2018/0373987 A1 | 12/2018 | Zhang et al. | |
| 2019/0130206 A1 | 5/2019 | Trott et al. | |
| 2019/0130218 A1 | 5/2019 | Albright et al. | |
| 2019/0130248 A1 | 5/2019 | Zhong et al. | |
| 2019/0130249 A1 | 5/2019 | Bradbury et al. | |
| 2019/0130273 A1 | 5/2019 | Keskar et al. | |
| 2019/0130312 A1 | 5/2019 | Xiong et al. | |
| 2019/0130896 A1 | 5/2019 | Zhou et al. | |
| 2019/0130897 A1 | 5/2019 | Zhou et al. | |
| 2019/0149834 A1 | 5/2019 | Zhou et al. | |
| 2019/0155877 A1* | 5/2019 | Sharma | G06F 40/253 |
| 2019/0251168 A1 | 5/2019 | McCann et al. | |
| 2019/0188568 A1 | 6/2019 | Keskar et al. | |
| 2019/0213482 A1 | 7/2019 | Socher et al. | |
| 2019/0251431 A1 | 8/2019 | Keskar et al. | |
| 2019/0258714 A1 | 8/2019 | Zhong et al. | |
| 2019/0258901 A1 | 8/2019 | Albright et al. | |
| 2019/0258939 A1 | 8/2019 | Min et al. | |
| 2019/0278835 A1* | 9/2019 | Cohan | G06N 3/0454 |
| 2019/0286073 A1 | 9/2019 | Asl et al. | |
| 2019/0294668 A1* | 9/2019 | Goel | H04N 21/26603 |
| 2019/0295530 A1 | 9/2019 | Asl et al. | |
| 2019/0311002 A1 | 10/2019 | Paulus | |
| 2019/0325066 A1* | 10/2019 | Krishna | G06F 16/313 |
| 2019/0327103 A1* | 10/2019 | Niekrasz | G06F 16/345 |
| 2019/0347328 A1* | 11/2019 | Rush | G10L 15/197 |
| 2019/0370338 A1* | 12/2019 | Kong | G06N 3/0445 |

OTHER PUBLICATIONS

Bahdanau et al., "Neural Machine Translation by Jointly Learning to Align and Translate," Published as a conference paper at International Conference on Learning Representations (ICLR) 2015 pp. 1-15 arXiv:1409.0473v7.

Ben-Tai, "Characterization of pareto and lexicographic optimal solutions," In Multiple Criteria Decision Making Theory and Application, Springer. 1980. pp. 1-11.

Bengio et al., "Scheduled sampling for sequence prediction with recurrent neural networks." In Neural Information Processing Systems, 2015, pp. 1171-1179.

Colmenares et al., "Heads: Headline Generation as Sequence Prediction Using an Abstract Feature-Rich Space," Human Language Technologies: The 2015 Annual Conference of the North American Chapter of the Association for Computational Linguistics, Denver, Colorado, May 31-Jun. 5, 2015. pp. 1-10.

Dorr et al., "Hedge Trimmer: A Parse-and-Trim Approach to Headline Generation," Proceedings of the North American Chapter of the Association for Computational Linguistics: Human Language Technologies. May 31-Jun. 1, 2013. Stroudsburg, PA, USA. pp. 1-8.

Durrett et al., "Learning-based single-document summarization with compression and anaphoricity constraints," In Proceedings of the 54th Annual Meeting of the Association for Computational Linguistics. Berlin Germany, Aug. 7-12, 2016. pp. 1998-2008.

Fedus et al., "Maskgan: Better text generation via filling in the ___," In 6th International Conference on Learning Representatives, Vancouver, Canada. Apr. 30-May 3, 2018, 17 pages.

Filippova et al., "Overcoming the Lack of Parallel Data in Sentence Compression," Proceedings of the 2013 Conference on Empirical Methods in Natural Language Processing, Seattle, Washington. Oct. 18-21, 2013. pp. 1-11.

Goyal et al., "Professor forcing: A new algorithm for training recurrent networks," In 30th Conference on Neural Information Processing Systems, Barcelona, Spain, Dec. 5-10, 2016. 9 pages.

Guimaraes et al., "Objective-reinforced generative adversarial networks (ORGAN) for sequence generation models," CoRR, abs/1705 .10843. 2017. 7 pages.

Hermann et al., "Teaching Machines to Read and Comprehend," In 28th International Conference on Neural Information Processing Systems, vol. 1. Montreal, Canada, Dec. 7-12, 2015. pp. 1-9.

Hochreiter et al., "Long Short-Term Memory," Massachusetts Institute of Technology, Neural Computation, vol. 9 (1997) pp. 1735-1780, pp. 1-46.

Huszar, "How (not) to train your generative model: Scheduled sampling, likelihood, adversary?" CoRR, abs/1511.05101, Nov. 16, 2015. 9 pages.

Inan et al., "Tying Word Vectors and Word Classifiers: A Loss Framework for Language Modeling," International Conference on Learning Representation, Toulon, France. Apr. 24-26, 2017. pp. 1-13.

Lin et al., "ROUGE: A Package for Automatic Evaluation of Summaries," In Text Summarization Branches out, Proceedings of the Association for Computational Linguistics Workshop (vol. 8), Barcelona, Spain, May 2-7, 2004. pp. 1-8.

Liu et al., "Generative adversarial network for abstractive text summarization," In the 32nd AAAI Conference on Artificial Intelligence, New Orleans, Louisiana, USA, Feb. 2-7, 2018. pp. 8109-8110.

Merity et al., "Regularizing and Optimizing LSTM Language Models," arXiv preprint arXiv:1708.02182, Aug. 7, 2017, pp. 1-10.

Nallapati et al., "Summarunner: A recurrent neural network based sequence model for extractive summarization of documents," In

(56) References Cited

OTHER PUBLICATIONS

Proceedings of the 31st AAAI Conference on Artificial Intelligence, San Francisco, California, USA, Feb. 4-9, 2017. pp. 3075-3081.

Nallapati et al., "Abstractive Text Summarization Using Sequence-to-Sequence RNNs and Beyond," Proceedings of the 20th SIGNLL Conference on Computational Natural Language Learning, Aug. 26, 2016, arXiv:1602.06023v5, pp. 1-12.

Neto et al., "Automatic Text Summarization Using a Machine Learning Approach," Brazilian Symposium on Artificial Intelligence. Ger-Verlag Berlin, Heidelberg, Nov. 11-14, 2002. pp. 1-11.

Over et al., "Duc in context," Information Processing & Management, vol. 43, Issue 6, Nov. 2007, pp. 1506-1520.

Pasunuru et al., "Multi-reward reinforced summarization with saliency and entailment," In Proceedings of the North American Chapter of the Association for Computational Linguistics: Human Language Technologies (NAACL-HLT), New Orleans, Louisiana, Jun. 1-6, 2018, pp. 646-653.

Paulus et al., "A Deep Reinforced Model for Abstractive Summerization," arxiv preprint arxiv:1705.04304. https://arxiv.org/abs/1705.04304, Nov. 16, 2017, pp. 1-12.

Press et al., "Using the Output Embedding to Improve Language Models," Proceedings of the 15th Conference of the European Chapter of the Association for Computational Linguistics: vol. 2 (Short Papers). Valencia, Spain. Apr. 3-7, 2017. pp. 157-163.

Rush et al., "A Neural Attention Model for Sentence Summarization," Proceedings of the 2015 Conference on Empirical Methods in Natural Language Processing, Lisbon, Portugal, Sep. 17-21, 2015. pp. 1-11.

Sandhaus, "The New York Times Annotated Corpus Overview," Linguistic Data Consortium (LDC2008T19). Philadelphia, PA, Oct. 17, 2008. pp. 1-22.

Schulman et al., "Gradient Estimation Using Stochastic Computation Graphs," Advances in Neural Information Processing Systems, Montreal, Canada, Dec. 7-12, 2015. pp. 1-9.

See et al., "Get to the Point: Summarization with Pointer-Generator Networks," In Proceedings of the 55th Annual Meeting of the Association for Computational Linguistics, vol. 1: Long Papers, Vancouver, Canada, Jul. 30-Aug. 4, 2017. http://aclweb.anthology/PI7-1099. pp. 1073-1083.

Sriram et al., "Cold fusion: Training seq2seq models together with language models," CoRR, abs/1708.06426, Aug. 21, 2017. 7 pages.

Wiseman et al., "Sequence-to-Sequence Learning as Beam-Search Optimization," 2016 Conference on Empirical Methods in Natural Language Processing, arXiv:1606.02960, Nov. 10, 2016, pp. 1-11.

Zeiler et al., "Regularization of neural networks using dropconnect," In Proceedings of the 30th International Conference on Machine Learning, Atlanta, Georgia, USA, Jun. 17-19, 2013. 9 pages.

Zhang et al., "Actor-critic sequence training for image captioning," CoRR, abs/1706.09601, Nov. 28, 2017. 10 pages.

International Search Report and Written Opinion dated Aug. 6, 2019 issued in PCT App. No. PCT/US2019/032796 (16 pages).

Wojciech Kryscinski et al.: "Improving Abstraction in Text Summarization", arxiv.org, arXiv:1808.07913v1 [cs.CL] Aug. 23, 2018, Aug. 23, 2018 (Aug. 23, 2018), XP055609838, Retrieved from the internet: URL:https://arxiv.org/pdf/1808.07913.pdf [retrieved on Jul. 30, 2019].

Tian Shi et al.: "Neural Abstractive Text Summarization with Sequence-to-Sequence Models", ARXIV.org, Cornell University Library, 201 Olin Library Cornell University Ithaca, NY 14853, Dec. 5, 2018 (Dec. 5, 2018), XP080989741.

Haoyu Zhang et al.: "Pretraining-Based Natural Language Generation for Text Summarization", ARXIV.org, Cornell University Library, 201 Olin Library Cornell University Ithaca, NY 14853, Feb. 25, 2019 (Feb. 25, 2019), XP081162124.

\* cited by examiner

400

Article

(cnn) to allay possible concerns, boston prosecutors released video friday of the shooting of a police officer last month that resulted in the killing of the gunman. the officer wounded, john moynihan, is white. angelo west, the gunman shot to death by officers, was black. after the shooting, community leaders in the predominantly african-american neighborhood of (...)

Human-written summary boston police officer john moynihan is released from the hospital . video shows that the man later shot dead by police in boston opened fire first. moynihan was shot in the face during a traffic stop.

Generated summary (See et al., 2017)

boston prosecutors released video friday of the shooting of a police officer last month. the gunman shot to death by officers. was black . one said the officers were forced to return fire . he was placed in a medically induced coma at a boston hospital

Generated summary (Liu et al., 2018)

boston prosecutors released video of the shooting of a police officer last month . the shooting occurred in the video of the boston marathon bombing . the video shows west sprung out and fired a shot with a pistol at officer's face.

Our summary (ML+RL ROUGE+Novel, with LM)

new: boston police release video of shooting of officer , john moynihan. new: angelo west had several prior gun convictions. police say. boston police officer john moynihan 34 survived with a bullet wound . he was in a medically induced coma at a boston hospital , a police officer says.

Fig. 4

| Model | R-1 | R-2 | R-L | NN-1 | NN-2 | NN-3 | NN-4 |
|---|---|---|---|---|---|---|---|
| *anonymized* | | | | | | | |
| Ground truth summaries | - | - | - | 14.40 | 52.07 | 71.63 | 80.84 |
| ML+RL intra-attn (Paulus et al., 2017) | 39.87 | 15.82 | 36.9 | 1.04 | 10.86 | 21.53 | 29.27 |
| ML+RL ROUGE+Novel, with LM (ours) | 40.02 | 15.53 | 37.44 | 3.54 | 21.91 | 37.48 | 47.13 |
| *full-text* | | | | | | | |
| Ground truth summaries | - | - | - | 13.55 | 49.97 | 70.32 | 80.02 |
| Pointer-gen + coverage (See et al., 2017) | 39.53 | 17.28 | 36.38 | 0.07 | 2.24 | 6.03 | 9.72 |
| SumGAN (Liu et al., 2018) | 39.92 | 17.65 | 36.71 | 0.22 | 3.15 | 7.68 | 11.84 |
| RSal (Pasunuru and Bansal, 2018) | 40.36 | 17.97 | 37.00 | - | 2.37 | 6.00 | 9.50 |
| RSal+Ent RL (Pasunuru and Bansal, 2018) | 40.43 | 18.00 | 37.10 | - | - | - | - |
| ML+RL ROUGE+Novel, with LM (ours) | 40.19 | 17.38 | 37.52 | 3.25 | 17.21 | 30.46 | 39.47 |

Fig. 5

| Model | R-1 | R-2 | R-L | NN-1 | NN-2 | NN-3 | NN-4 |
|---|---|---|---|---|---|---|---|
| ML | 39.21 | 15.47 | 36.27 | 2.47 | 14.1 | 25.35 | 33.46 |
| ML with nov. baseline, $r = 0.0005$ | 38.62 | 15.06 | 35.75 | 3.12 | 14.96 | 26.45 | 34.76 |
| ML with LM | 39.43 | 15.68 | 36.45 | 3.36 | 15.25 | 26.06 | 33.57 |
| ML+RL ROUGE | 41.02 | 16.62 | 38.13 | 2.2 | 12.88 | 24.16 | 32.5 |
| ML+RL ROUGE, with LM | 41.06 | 16.84 | 38.01 | 2.06 | 10.9 | 19.78 | 26.33 |
| ML+RL ROUGE+Novel | 40.61 | 15.84 | 38.06 | 3.19 | 22.79 | 30.9 | 50.61 |
| ML+RL ROUGE+Novel, with LM | 40.72 | 15.95 | 38.14 | 3.49 | 21.89 | 37.31 | 46.85 |

Fig. 6

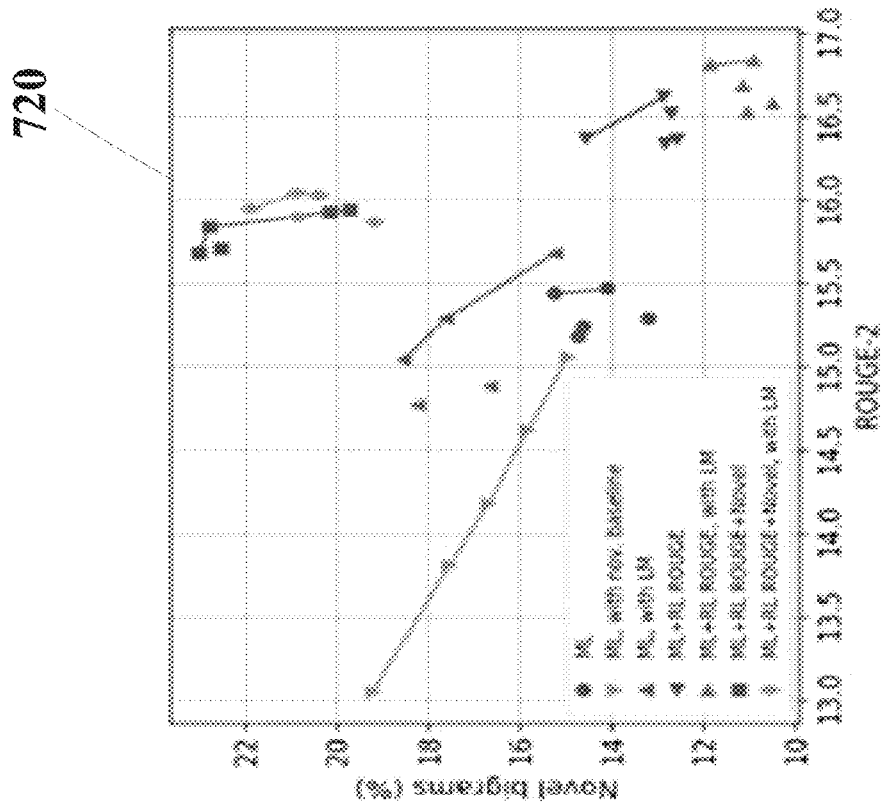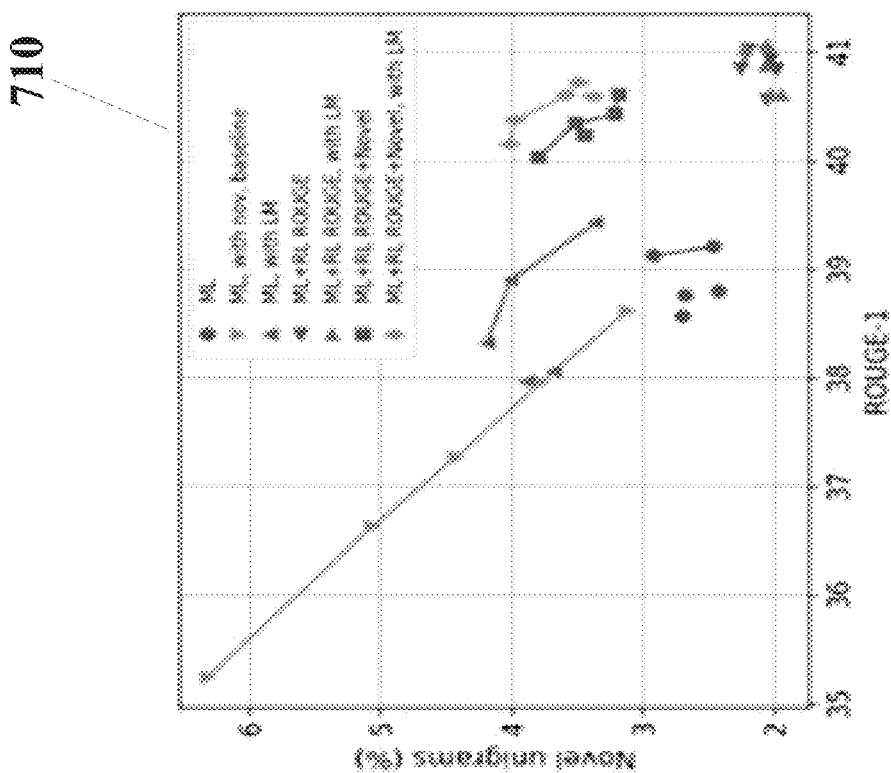
Fig. 7

ABSTRACTION OF TEXT SUMMARIZATION

RELATED APPLICATIONS

The present application claims priority to U.S. Provisional Patent Application Ser. No. 62/675,147 filed on May 22, 2018 and entitled "Improving Abstractiveness of Text Summarization Models," which is incorporated by reference in its entirety.

TECHNICAL FIELD

The present disclosure relates generally to natural language processing and more specifically to improving abstraction of text summarization.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In recent times, a fundamental change has occurred in the way that people take in new information. The bottleneck is no longer access to information; rather, it is the ability of people to keep up with all of the information directed to them, for example, through their jobs, the news, social media, etc. To help people with this information deluge, artificial intelligence techniques can be applied, for example, to perform text summarization.

Text summarization is the task of compressing a long sequence of text into a more concise version. For a text summary to be considered high quality, the summary should have certain characteristics: it should be shorter than the original document; it should convey only the most important information; it should accurately reproduce the factual information of the source document and not include any external knowledge; and it must be semantically and syntactically correct. The two most common approaches to text summarization are extractive and abstractive. With extractive text summarization, salient parts of the source document are extracted and included in the summary without change. With abstractive text summarization, not only are salient parts of the source document extracted, but they are also concisely paraphrased.

BRIEF DESCRIPTION OF THE DRAWINGS

FIG. 4 is a table showing example summaries generated by different models for the same original source document.

FIG. 5 is a table comparing test results for the neural model of the present disclosure and other abstractive summarization models.

FIG. 6 is a table comparing results of an ablation study for the neural model of the present disclosure and other abstractive summarization models.

FIG. 7 are charts plotting results on a validation set for different runs of the neural model of the present disclosure and other abstractive summarization models.

Figure 1:
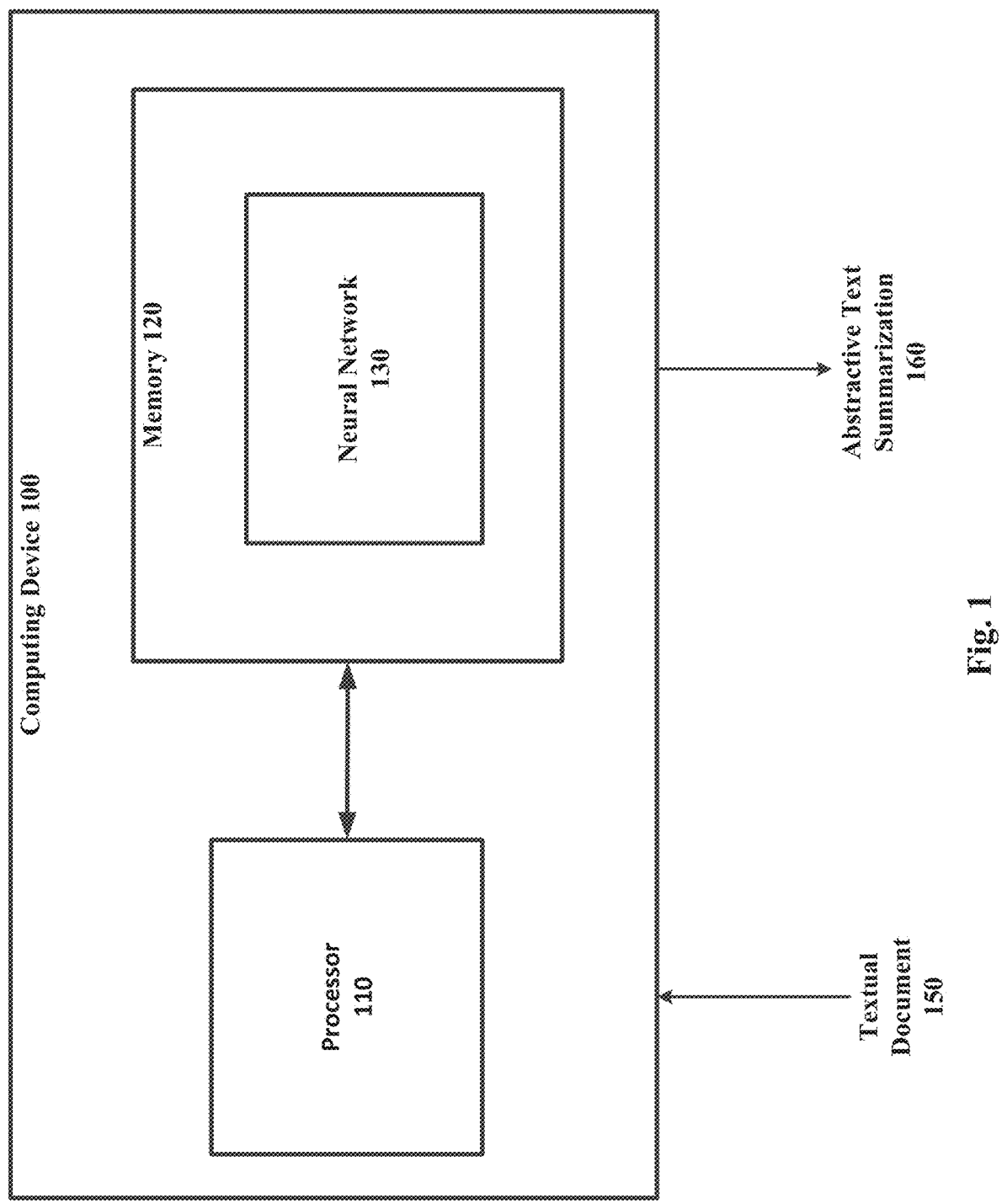
FIG. 1 is a simplified diagram of a computing device according to some embodiments.

In the figures, elements having the same designations have the same or similar functions.

DETAILED DESCRIPTION

This description and the accompanying drawings that illustrate aspects, embodiments, implementations, or applications should not be taken as limiting the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Neural networks have demonstrated great promise as a technique for automatically analyzing real-world information with human-like accuracy. In general, neural network models receive input information and make predictions based on the input information. Whereas other approaches to analyzing real-world information may involve hard-coded processes, statistical analysis, and/or the like, neural networks learn to make predictions gradually, by a process of trial and error, using a machine learning process. A given neural network model may be trained using a large number of training examples, proceeding iteratively until the neural network model begins to consistently make similar inferences from the training examples that a human might make. Neural network models have been shown to outperform and/or have the potential to outperform other computing techniques in a number of applications. According to some embodiments, a neural network is employed to perform the task of abstractive text summarization.

Abstractive text summarization attempts to shorten (condense and rephrase) a long textual document into a human readable form that contains the most important facts from the original document. A high quality summary of a text document is usually shorter than the original document, conveys only the most important and no extraneous information, and is semantically and syntactically correct. Moreover, the summary should use novel phrases with words that do not necessarily appear in the source document in order to concisely paraphrase the meaning—in other words, abstractive. Existing abstractive text summarization techniques tend to replicate or copy long passages of the source document directly into the summary, thereby producing summaries that are not really abstractive.

In this disclosure, an approach is provided to improve the level of abstraction of summaries generated for respective text documents. According to some embodiments, systems and methods are disclosed herein for a neural network model generating an abstractive text summarization from a source document. The level of abstraction of the text summarization generated by this model is improved as compared to other text summarization models.

In some embodiments, the neural network abstractive summarization model comprises a decoder that is decomposed into a contextual model and a language model. The contextual model retrieves relevant parts of the source document, and is responsible for extracting and compacting the source document. The language model is responsible for the generation of concise paraphrases for the text summarization of the source document. The neural model can be pretrained so that it incorporates prior knowledge about language generation.

In some embodiments, the neural network abstractive summarization model implements or uses a novelty metric, which serves as a reinforcement learning reward to encourage summary abstraction by the neural network model. The novelty metric can be optimized directly through policy learning to encourage the generation of novel phrases for summarizing the text document. In some embodiments, the novelty metric can be used in conjunction with a policy that rewards word-overlap with the ground-truth summary to encourage correctness in the text summarization.

With these techniques, and others described herein, the neural model of this disclosure generates a concise summary of a source text document without replicating long passages from the source document. Summarization models can be evaluated using metrics for word overlap with ground-truth summaries, such as in the form of ROUGE scores, as described in further detail in Lin, "Rouge: A package for automatic evaluation of summaries," in *Proc. ACL workshop on Text Summarization Branches Out*, 2004, p. 10, which is incorporated by reference herein. Because word-overlap metrics do not capture the abstractive aspect of high quality summaries, other metrics such as n-gram overlap can be applied to evaluate text summaries. Experiments and validation tests (for example, on the CNN/Daily Mail dataset) show that the neural network model of this disclosure achieves results comparable to the state-of-the-art models (as determined by the ROUGE metric) while achieving a significantly higher level of abstraction as measured by n-gram overlap with the source document. In other words, the abstractive summarization model of this disclosure generates summaries that are much more abstractive that previous approaches, while maintaining high ROUGE scores close to or above the state-of-the-art.

The neural network model of the present disclosure can be implemented in a computing device. FIG. 1 is a simplified diagram of such a computing device 100 according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities. In some embodiments, memory 120 may include non-transitory, tangible, machine readable media that includes executable code that when run by one or more processors (e.g., processor 110) may cause the one or more processors to perform the methods described in further detail herein.

As shown, memory 120 includes a neural network 130. Neural network 130 may be used to implement and/or emulate any of the neural networks described further herein. In some examples, neural network 130 may include a multi-layer or deep neural network. In some embodiments, the neural network 130 is implemented with or incorporates a recurrent neural network (RNN), with encoder-decoder architecture. Each of the encoder and decoder modules may include or be implemented with Long Short-Term Memory (LSTM) units.

Neural network 130 implements or incorporates a system or model, and corresponding methods, for abstractive text summarization, as described herein. In some embodiments, the abstractive text summarization system or model of the neural network 130 may be used to provide an abstractive text summarization of a textual document. In some embodiments, the neural network 130 includes modules or processes to iteratively train and/or evaluate the system or model used to generate an abstractive text summarization of a textual document.

In some embodiments, the neural network 130 implements a mixed objective that jointly optimizes the n-gram overlap with the ground-truth summary while encouraging abstraction. This can be accomplished by combining maximum likelihood estimation with policy gradient. The policy is rewarded with the ROUGE metric, which measures word-overlap with the ground-truth summary to encourage correctness, as well as a novel abstraction reward that encourages the generation of words not in the source document.

As shown, computing device 100 receives a textual document 140, which is provided to neural network 130. Neural network 130 then generates an abstractive text summarization 160 based on the textual document 140. The neural network 130 can be trained on various datasets, as described below in more detail. According to some embodiments, also as described in further detail below, a novelty metric is employed or implemented to reward the neural network model 130 for generating words for the summary that are not in the source document.

Figure 2:
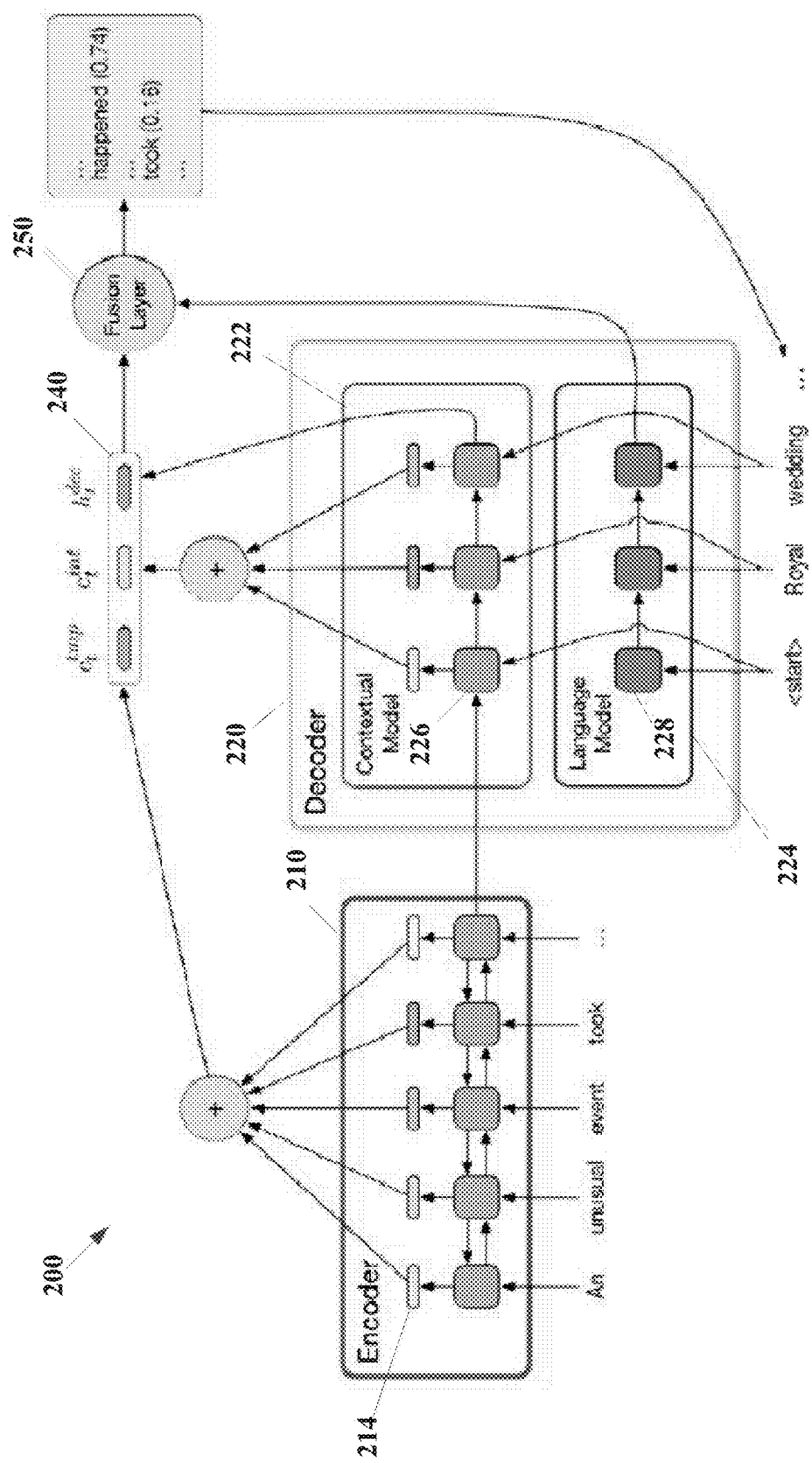
FIG. 2 is a simplified diagram of a network architecture for generating an abstractive text summarization according to some embodiments.

FIG. 2 is a simplified diagram of an architecture for a neural network model 200 generating abstractive text summarization according to some embodiments. The neural network model 200 of FIG. 2 can be an implementation of the neural network 130 (FIG. 1). As shown in FIG. 2, the neural network 200 includes an encoder 210, a decoder 220, and a fusion layer 250. And FIG. 3 shows a corresponding method 300 for the neural network model illustrated in FIG. 2.

Figure 3:
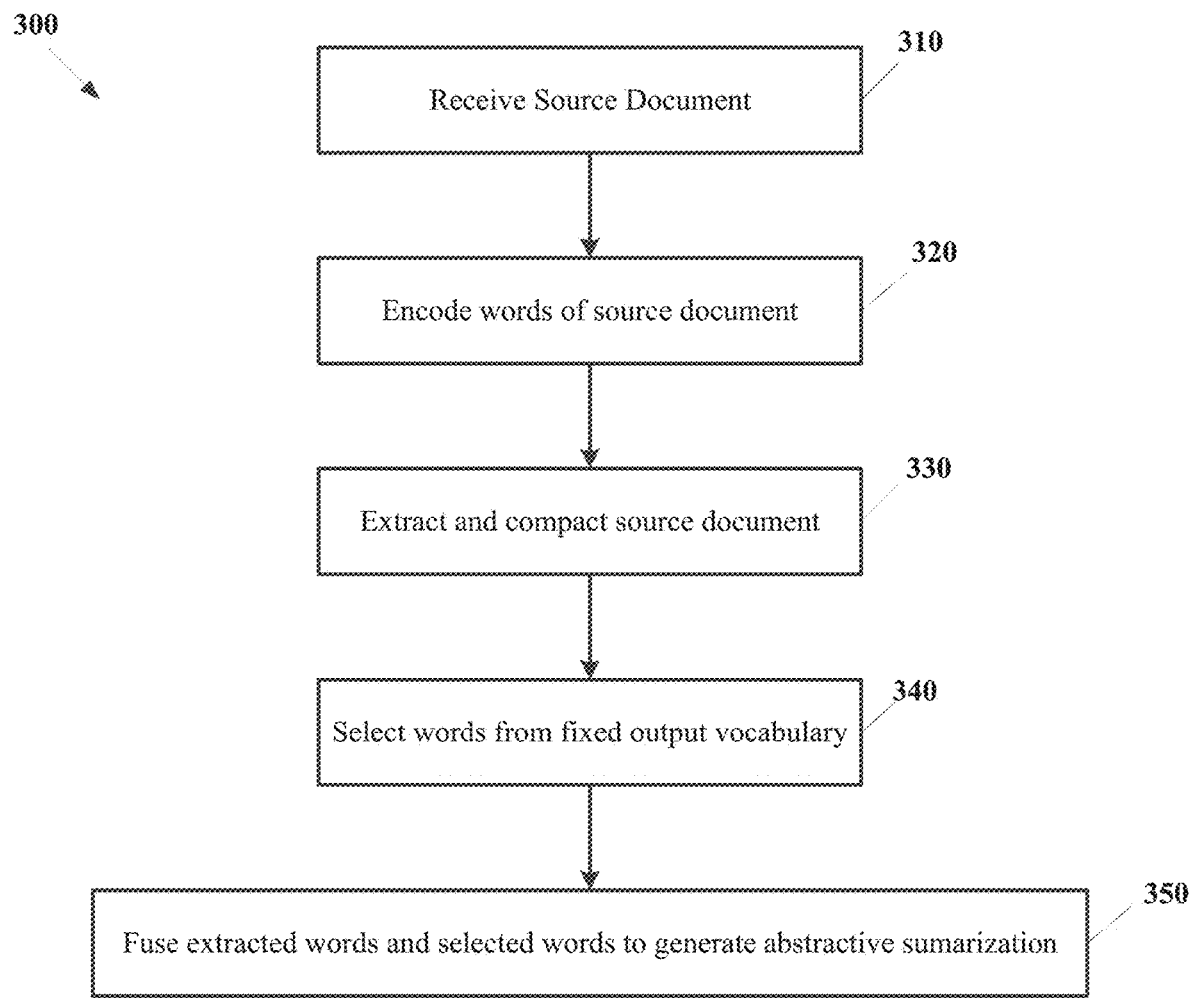
FIG. 3 is a simplified diagram of a method for generating abstractive text summarization according to some embodiments.

With reference to FIGS. 2 and 3, the method 300 starts with a process 310. At process 310, the neural model 200 receives as input a source textual document (e.g., textual document 150). The source document $h^{enc}$ comprises a number (n) of words (e.g., "An unusual event took . . . ").

At a process 320, the encoder 210 of the neural model encodes or embeds the words of the source document 150, for example, by mapping each word in the document to a vector space or matrix. In some embodiments, to accomplish the encoding or embedding, the encoder 210 is implemented with or incorporates one or more long-term short-term memory (LSTM) encoders 212. In some embodiments, the encoder 210 encodes the input sequence, for example, with each LSTM 212 taking in a respective word of the source document and outputting a respective vector 214. The encoder 210 is run forward so that information generated by an LSTM encoder 212 operating on a word appearing earlier in the source document is passed to an LSTM encoder 212 operating on a word appearing later in the sequence. This allows the hidden vectors of the later LSTM encoders 212 to incorporate information for the earlier words. In some embodiments, the encoder 210 is also run backwards so that the LSTM encoders 212 can generate or output vectors that incorporate information from words that appear later in the sequence. These backwards output vectors can be concatenated with the forward output vectors to yield a more useful hidden vector. Each pair of forward and backward LSTM encoders can be treated as a unit, and is typically referred to as a bidirectional LSTM. A bidirectional LSTM encoder incorporates information that precedes and follows the respective word.

The encoder 210 with bidirectional LSTMs 212 takes in a sequence of words from the source document 150, runs a forward and a backward LSTM operation, concatenates the outputs corresponding to the same input, and returns the resulting sequence of vectors or encodings h. Let $E \in \mathbb{R}^{n \times d}$ denote the matrix of $d^{emb}$ dimensional word embeddings of the n words in the source document. The encoding of the source document $h^{enc}$ is computed via BiLSTM whose output has dimension $d^{hid}$.

$$h^{enc} = \text{BiLSTM}(E) \in \mathbb{R}^{d^{hid}} \quad (1)$$

Encoder 210 generates a temporal attention context at time t, $c_t^{tmp}$. The output or final states from encoder 210 are passed or provided to decoder 220.

In order to produce an abstractive summarization of the source document, the neural network model 200 cannot exclusively copy from the text document. Instead, the model should parse chunks of the source document and create concise summaries using phrases not in the source document. To accomplish this, the decoder 220 operates to extract relevant parts of the source document through the pointer network as well as to compose paraphrases from a fixed vocabulary. According to embodiments of the present disclosure, these two operations or responsibilities are decoupled or separated.

Thus, as shown in FIG. 2, the decoder 220 is factorized into separate models—a contextual model 222 and a language model 224. The language model 222 assumes responsibility of generating words for the summary from the fixed vocabulary, thus allowing the contextual model 224 of the decoder 220 to focus on attention and extraction of words from the source document. This decoupling or decomposition of operations in the decoder 220 also allows the may have the language model 224 to be pre-trained on other large scale text corpora, thus providing the added benefit of incorporating into the neural model 200 external knowledge about fluency or domain specific styles.

At a process 330, the contextual model 222 of the decoder 220 extracts words from and compacts the source textual document 150. Contextual model 222 uses or incorporates an encoder which, in some embodiments, can be implemented as a single LSTM recurrent neural network (RNN) comprising encoders 226. LSTM RNN computes hidden states from the embedding vectors. The recurrent attentive decoder 220 is initialized with an ultimate hidden state from the encoder 210 and a special start-of-summary token to produce decoder hidden states at successive decoding steps.

In some embodiments, the contextual model 222 uses, incorporates, or implements an encoder temporal attention. The encoder temporal attention penalizes input tokens that previously had high attention scores. Let $h_t^{dec}$ denote the decoder state at time t. The encoder temporal attention context at time t, $c_t^{tmp}$, is computed as:

$$s_{ti}^{tmp} = (h_t^{dec})^T W^{tmp} h_i^{enc} \in \mathbb{R} \quad (2)$$

$$q_{ti}^{tmp} = \frac{\exp(s_{ti}^{tmp})}{\sum_{j=1}^{t-1} \exp(s_{ji}^{tmp})} \in \mathbb{R} \quad (3)$$

$$\alpha_{ti}^{tmp} = \frac{q_{ti}^{tmp}}{\sum_{j=1}^{n} q_{tj}^{tmp}} \in \mathbb{R} \quad (4)$$

$$c_t^{tmp} = \sum_{i=1}^{n} \alpha_{ti}^{tmp} h_i^{enc} \in \mathbb{R}^{d^{bid}} \quad (5)$$

where $q_{ti}^{tmp}$ is set to $\exp(s_{ti}^{tmp})$ for t=1.

The contextual model 222 also attends to the decoder's previous states via decoder intra-attention over the decoded sequence. The decoder intra-attention context at time t, $c_t^{int}$, can be computed as:

$$s_{ti}^{int} = (h_t^{dec})^T W^{int} h_i^{dec} \in \mathbb{R} \quad (6)$$

$$c_t^{int} = \sum_{i=1}^{t-1} \left( \frac{s_{ti}^{int}}{\sum_{j=1}^{n} s_{tj}^{int}} \right) h_i^{dec} \in \mathbb{R}^{d^{bid}} \quad (7)$$

A reference vector 240 is generated, created, or derived from the temporal attention context vector $c_t^{tmp}$ (computed or generated by encoder 210), and the intra-attention context vector $c_t^{int}$ and the hidden state of the contextual model $h_t^{dec}$ (both computed or generated by contextual model 222). The reference vector 240 relates to words that may be extracted from the source document for inclusion in a summarization.

In order to generate an abstractive summarization of the document, the words extracted from the source document are combined with paraphrases of other words or phrases from the document. To accomplish this, the decoder 220 generates tokens by interpolating between selecting words from the source document via a pointer network and selecting words from a fixed output vocabulary.

Thus, at a process 340, the language model 224 of the decoder 220 generates vectors for composing paraphrases of select words or phrases of the source document, the paraphrasing from the fixed vocabulary. In some embodiments, the language model 224 utilizes or incorporates an encoder which can be implemented as a three-layer unidirectional LSTM with weight-dropped LSTM units 228. In some embodiments, the architecture of the language model 224 is based on the model described in further detail in Merity, et al., "Regularizing and optimizing lstm language models," in *ICLR,* 2018, which is incorporated by reference herein. In some embodiments, as described herein in further detail, the language model 224 is pre-trained on a training dataset (such as the CNN/Daily Mail dataset) before being used by neural network 200 for abstractive summarization.

In operation for the language model 224, let $z_t$ denote the ground truth label as to whether the tth output word of the summarization should be generated by the decoder 220 selecting from the fixed output vocabulary as opposed to from the source document. The probability $p(z_t)$ that the decoder 220 generates from the output vocabulary is computed as:

$$r_t = [h_t^{dec}; c_t^{tmp}; c_t^{int}] \in \mathbb{R}^{3d^{hid}} \quad (8)$$

$$p(z_t) = \text{sigmoid}(W^z r_t + b^z) \in \mathbb{R} \quad (9)$$

The probability of the language model 224 selecting the word $y_t$ from a fixed vocabulary at time step t is defined as:

$$p^{gen}(y_t) = \text{softmax}(W^{gen} r_t + b^{gen}) \quad (10)$$

The probability $p^{cp}(y_t)$ of the decoder 220 copying the word $y_t$ from the source document is set to the temporal attention distribution $\alpha_t^{tmp}$. The joint probability $p(z_t, y_t)$ of generating the word $y_t$ at time step t is then:

$$p(z_t, y_t) = p(y_t | z_t) p(z_t) \quad (11)$$

the likelihood of which is $$\log p(z_t, y_t) = \log p(y_t | z_t) + \log p(z_t) = \quad (12)$$
$$z_t \log p^{gen}(y_t) + (1 - z_t) \log p^{cp}(y_t) + z_t \log p(z_t) +$$
$$(1 - z_t) \log (1 - p(z_t)) = z_t (\log p^{gen}(y_t) + \log p(z_t)) +$$
$$(1 - z_t)(\log p^{cp}(y_t) + \log(1 - p(z_t)))$$

The objective function combines maximum likelihood estimation with policy learning for the neural network model 200. Let m denote the length of the ground truth summary, maximum likelihood loss $L^{ml}$ is computed as:

$$L^{ml} = -\sum_{t=1}^{m} \log p(z_t, y_t) \quad (13)$$

Policy learning for the neural network 200 uses ROUGE-L as its reward function and self-critical baseline using the greedy decoding policy, as described in further detail in Rennie, et al., "Self-critical sequence training for image captioning," CoRR, abs/1612.00563, 2016, which is incorporated by reference herein. Let $y^{sam}$ denote the summary obtained by sampling from the current policy p, $y^{gre}$ and $z^{gre}$ the summary and generator choice obtained by greedily choosing from $p(z_t, y_t)$, and R(y) the ROUGE-L score of the summary y, and $\Theta$ the model parameters. The policy learning loss is:

$$\hat{R} = R(y^{sam}) - R(y^{gre}) \quad (14)$$

$$L^{pg} = -\mathbb{E}_{z^{sam} \sim p(z), [\hat{R}]} \quad (15)$$
$$y^{sam} \sim p(y|z)$$

where greedy predictions are used by the model according to eq. (13) as a baseline for variance reduction.

In some embodiments, as described in further detail in Schulman, et al., "Gradient estimation using stochastic computation graphs," in NIPS, 2015, which is incorporated by reference herein, the policy gradient is computed as:

$$\nabla_\Theta L^{pg} \approx -\hat{R} \sum_{t=1}^{m} \nabla_\Theta \log p(z_t^{sam}, y_t^{sam}) \quad (16)$$

The final loss is a mixture between the maximum likelihood loss and the policy learning loss, weighted by a hyperparameter $\gamma$.

$$L = (1-\gamma) L^{ml} + \gamma L^{pg} \quad (17)$$

At a process 350, the fusion layer 250 in conjunction with the language model 224 generates an abstractive text summarization of the source document. In particular, the fusion layer 250 fuses the reference vector 240 (composed of context vectors $c_t^{tmp}$, $c_t^{int}$, and the hidden state of the contextual model $h_t^{dec}$) with the hidden state vector of the last LSTM of the language model 224. In some embodiments, this can be done in a fashion similar to that described in further detail in Sriram, et al., "Cold fusion: Training seq2seq models together with language models," CoRR, abs/1708.06426, 2017, which is incorporated by reference herein.

In some embodiments, the neural network 220 (with fusion layer 250 and language model 224) operates as follows to create the abstractive summarization for the source document on a word-by-word basis. Let $e_t$ denote the embedding of the word generated during time step t. The hidden state vector of the language model 224 at the lth layer is:

$$h_{l,t}^{lm} = \text{LSTM}_3^{lm}(e_{t-1}, h_{l,t-1}^{lm}) \quad (18)$$

At each time step t, the hidden state vector ($h_{3,t}^{lm}$) of the last LSTM of the language model 224 is combined with $r_t$ defined in eq. (8) in a fashion similar to Sriram, et al., "Cold fusion: Training seq2seq models together with language models," CoRR, abs/1708.06426, 2017, which is incorporated by reference herein. Let $\odot$ denote element-wise multiplication. The fusion layer 250 uses a gating function whose output $g_t$ filters the content of the hidden state vector of the language model 224.

$$f_t = \text{sigmoid}(W^{lm}[r_t; h_{3,t}^{lm}] + b^{lm}) \quad (19)$$

$$g_t = W^{fuse}([r_t; g_t \odot h_{3,t}^{lm}]) + b^{fuse} \quad (20)$$

$$h_t^{fuse} = \text{ReLU}(g_t) \quad (21)$$

The output distribution $p^{gen}(y_t)$ of the language model 224 in eq. (10) is then replaced with:

$$p^{gen}(y_t) = \text{softmax}(W^{gen} b_t^{fuse} + b^{gen}) \quad (22)$$

Thus, the neural network model 200 of the present disclosure generates an abstractive summarization for an input source document.

According to some embodiments, a novelty metric is employed or implemented to promote abstraction by rewarding the neural network model 200 for generating words for the summary that are not in the source document.

A "novel" phrase in the summarization may be defined as one that is not in the source document. Let ng (x, n) denote the function that computes the set of unique n-grams in a document x, $x^{gen}$ the generated summary, $x^{src}$ the source document, and ‖ s ‖ the number of words in s. The unnormalized novelty metric N is defined as the fraction of unique n-grams in the summary that are novel.

$$N(x^{gen}, n) = \frac{\|ng(x^{gen}, n) - ng(x^{src}, n)\|}{\|ng(x^{gen}, n)\|} \quad (23)$$

To prevent the neural model 200 from receiving high novelty rewards by outputting very short summaries, the novelty metric is normalized by the length ratio of the generated and ground truth summaries. Let $x^{gt}$ denote the ground truth summary. The novelty metric is defined as:

$$R^{nov}(x^{gen}, n) = N(x^{gen}, n)\frac{\|x^{gen}\|}{\|x^{gt}\|} \quad (24)$$

The neural network model 200 incorporates the novelty metric as a reward into the policy gradient objective in eq. (15), alongside the original ROUGE-L metric. By doing so, the neural network model 200 is encouraged to generate summaries that both overlap with human written ground-truth summaries as well as incorporate novel words not in the source document.

$$R(y) = \lambda^{rou} R^{rou}(y^{sam}) + \lambda^{nov} R^{nov}(y^{sam}) \quad (25)$$

where $\lambda^{rou}$ and $\lambda^{nov}$ are hyperparameters (parameters of a prior distribution) that control the weighting of each reward metric.

One or more of the processes 310-350 of method 300 described herein may be implemented, at least in part, in the form of executable code stored on non-transitory, tangible, machine-readable media that when run by one or more processors (e.g., processor 110 of computing device 100) may cause the one or more processors to perform one or more of the processes or methods. Some common forms of machine readable media that may include the processes or methods are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

According to some embodiments, the neural network model 200 (e.g., language model 224) is trained before being employed or used to generate abstractive text summarizations. For this training, various datasets can be used, such as the CNN/Daily Mail dataset, as described in more detail in Hermann, et al., "Teaching machines to read and comprehend," in NIPS, 2015 and Nallapati, et al., "Abstractive text summarization using sequence-to-sequence rnns and beyond," *Proceedings of SIGNLL Conference on Computational Natural Language Learning*, 2016, both of which are incorporated by reference herein. Previous works on abstractive summarization either use an anonymized version of this dataset or the full original article and summary texts. In order to compare against previous results, the neural network model 200 can be trained on both versions of this dataset and evaluated. For the anonymized version, in some embodiments, the pre-processing steps described in further detail in Nallapati, et al., "Abstractive text summarization using sequence-to-sequence rnns and beyond," *Proceedings of SIGNLL Conference on Computational Natural Language Learning*, 2016, which is incorporated by reference herein, are followed. For the full-text version, the pre-processing steps in further detail in See, et al., "Get to the point: Summarization with pointer-generator networks," in *ACL*, 2017, which is incorporated by reference herein, are followed.

Named entities and the source document are used to supervise the neural network model 200 regarding when to use the pointer and when to use the generator (e.g., $z_t$ in eq. (13)). Namely, during training, the neural model 200 is taught to point from the source document if the word in the ground truth summary is a named entity, an out-of-vocabulary word, or a numerical value that is in the source document. In some embodiments, the list of named entities can be obtained as described in further detail in Hermann, et al., "Teaching machines to read and comprehend," in NIPS, 2015, which is incorporated by reference herein.

According to some embodiments, for each dataset version, a language model 224 comprising a 400-dimensional word embedding layer and a 3-layer LSTM (with each layer having a hidden vector size of 800 dimensions, except the last input layer which has an output size of 400) is trained. The final decoding layer shares weights with the embedding layer, for example, as described in further detail in Inan, et al., "Tying word vectors and word classifiers: A loss framework for language modeling," in *ICLR*, 2017 and Press, et al., "Using the output embedding to improve language models," arXiv preprint arXiv:160805859, 2016, both of which are incorporated by reference herein. The language model 224 can use DropConnect (the details of which are described in Wan, et al., "Regularization of neural networks using dropconnect," in *ICML*, 2013, which is incorporated by reference herein) in the hidden-to-hidden connections, as well as the non-monotonically triggered asynchronous gradient descent optimizer (described in further detail in Merity, et al., "Regularizing and optimizing lstm language models," in *ICLR*, 2018, which is incorporated by reference herein). In some embodiments, the language model 224 can be trained on the CNN/Daily Mail ground truth summaries only, following the same training, validation, and test splits as the main experiments.

Furthermore, in some embodiments, for training, the two LSTMs of bi-directional encoder 210 are 200-dimensional, and the LSTM of language model 224 of decoder 220 is 400-dimensional. The input vocabulary for the embedding matrix is restricted to 150,000 tokens, and the output decoding layer is restricted to 50,000 tokens. The size of input articles is limited to the first 400 tokens, and the summaries to 100 tokens. Scheduled sampling, as described in Bengio et al., "Neural machine translation by jointly learning to align and translate," in *ICLR*, 2015, which is incorporated by reference herein, is used with a probability of 0.25 when calculating the maximum-likelihood training loss. Set n=3 when computing the novelty reward $R^{nov}(x_{gen}, n)$. For final training loss using reinforcement learning, set $\gamma=0:9984$, $\mu^{rou}=0:9$, and $\lambda^{nov}=0:1$. Finally, the trigram repetition avoidance heuristic, defined by Paulus, et al., "A deep reinforced model for abstractive summarization," in *ICLR*, 2017, which is incorporated by reference herein, is used during beam search decoding to ensure that the model does not output twice the same trigram in a given summary, thus reducing the amount of repetitions.

In some embodiments, a novelty baseline is created for the neural network model 200 by taking the outputs of the base model, without ROUGE-L training and without the language model 224, and inserting random words not present in the article after each summary token with a probability r=0.0005. This baseline will intuitively have a higher percentage of novel n-grams than the base model outputs while being very similar to these original outputs, hence keeping the ROUGE score difference relatively small.

FIG. 4 is a table 400 showing example summaries generated by different models for the same original source document, e.g., an article from CNN/Daily Mail. The highlighted spans indicate phrases of 3 tokens or more that are copied word-by-word from the original article.

The advantages or improvements of the abstractive text summarization model of the present disclosure compared to other models are confirmed or validated by test results. A validation and test perplexity of 65.80 and 66.61 were obtained respectively on the anonymized dataset, and 81.13 and 82.98 on the full-text dataset with the language model 224 described herein.

FIG. 5 is a table 500 comparing performance results of systems and models for abstractive text summarization according to embodiments of the present disclosure. This table shows the ROUGE scores and novelty scores of the final summarization model on both versions of the CNN/Daily Mail dataset, including comparisons to previous works on the these datasets. In particular, the table of FIG. 5 provides the ROUGE-1, ROUGE-2, and ROUGE-L F-scores as well as the percentage of novel n-grams, marked NN-n, in the generated summaries, with n from 1 to 4. Also included are the novel n-gram percentages for ground truth summaries as a comparison to indicate the level of abstraction of human written summaries. As seen in FIG. 5, the neural network model 200 of the present disclosure, including language model 224, provides a much higher percentage of novel n-grams than all the previous abstractive approaches. It also achieves state-of-the-art ROUGE-L performance on both dataset versions, and obtains ROUGE-1 and ROUGE-2 scores close to state-of-the-art results.

In order to evaluate the relative impact of each of individual contributions, ablation studies were run to compare ablations of the neural network model 200, including language model 224, against a novelty baseline. FIG. 6 is a table 600 comparing results of the ablation study for the model of the present disclosure and other abstractive summarization models. This table of FIG. 6, which are the results of the ablation study on the validation set of the anonymized CNN/Daily Mail dataset, shows that adding the language model 224 to the decoder 220 improves abstraction and novelty in all of the conducted experiments. Results show that the base model trained with the maximum-likelihood loss only and using the language model 224 in the decoder 220 (ML, with LM) has higher ROUGE scores, novel unigrams, and novel bigrams scores than the base model without the language model 224 (ML). The language model 224 in the decoder 220 (ML with LM) also provides better results for these metrics than the novelty baseline. When training these models with reinforcement learning using the ROUGE reward (ML+RL ROUGE and ML+RL ROUGE with LM), the neural network model 200 with language model 224 obtains higher ROUGE-1 and ROUGE-2 scores. Finally, using the mixed ROUGE and novelty rewards (ML+RL ROUGE+Novel) produces both higher ROUGE scores and more novel unigrams with the language model 224 than without it. This indicates that by providing the language model 224 in the decoder 220 and the novelty reward during training, the neural network model 200 produces more novel unigrams while maintaining high ROUGE scores.

FIG. 7 are charts 710, 720 plotting results on the anonymized validation set for different runs of the model of the present disclosure and other abstractive summarization models. The first chart 710 plots the ROUGE-1 and novel unigram scores for the five best iterations of each model type on the anonymized dataset, and the second chart 720 plots the ROUGE-2 and novel bigram scores. These charts show the correlation between ROUGE and novel n-gram scores across different architectures, and to help to identify the model type that gives the best trade-off between each of these metrics. Also shown in the novelty baseline for values of r between 0.005 and 0.035. For each model type, the Pareto frontier is indicated by a line plot, as described in more detail in Ben-Tal, "Characterization of pareto and lexicographic optimal solutions," in *Multiple Criteria Decision Making Theory and Application*, pp. 1-11, 1980, which is incorporated by reference herein, illustrating which models of a given type give the best combination of ROUGE and novelty scores.

These plots show that the ROUGE scores are inversely correlated with novelty scores in all model types, illustrating the challenge of choosing a model that performs well in both. As can be seen in FIG. 7, the neural network model (ML+RL ROUGE+Novel, with LM) provides the best trade-off of ROUGE-1 scores compared to novel unigrams, indicated by the higher Pareto frontier in the first plot. Similarly, this model provides the best trade-offs of ROUGE-2 scores to novel bigrams. Thus, with reference to FIG. 7, the plots show that for each architecture, adding the language model 224 to the decoder 220 typically gives a better ROUGE score, a better novelty score, or both.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A system for providing an abstractive summary of a source textual document, the system comprising:
   an encoder generating, using a processor, an encoding for the source textual document and encoder temporal attention context vectors;
   a decoder separated into a contextual model and a language model, wherein the contextual model is generating, using the processor, decoder intra-attention context vectors and first vectors for extracting words from the source textual document using the encoding, and the language model is generating, using the processor, second vectors for composing paraphrases of selected words in the source textual document from a fixed vocabulary;
   a reference vector combining the encoder temporal attention context vectors, the decoder intra-attention context vectors, and the first vectors; and
   a fusion layer generating the abstractive summary of the source textual document from the reference vector and the second vectors.

2. The system of claim 1, wherein the system comprises a neural network.

3. The system of claim 1, wherein the system utilizes a novelty metric to encourage generation of novel phrases for inclusion in the abstractive summary.

4. The system of claim 1, wherein the system utilizes a metric that measures word-overlap of the abstractive summary with a ground-truth summary for the source textual document.

5. The system of claim 1, further comprising:
   prior to the language model of the decoder generating the second vectors, training the language model using a CNN/Daily Mail dataset.

6. The system of claim 1, wherein the language model comprises a multi-layer unidirectional Long Short-Term Memory (LSTM) unit for generating vectors.

7. A method for providing an abstractive summary of a source textual document, the method performed on a computer and comprising:
   generating, using a processor, at an encoder an encoding for the source textual document and an encoder temporal attention context vectors;
   generating, using a contextual model of a decoder and the encodings, a decoder intra-attention context vectors and first vectors for extracting words from the source textual document;
   generating, using a language model of the decoder that is separate from the contextual model, second vectors for composing paraphrases of selected words in the source textual document from a fixed vocabulary;
   generating a reference vector composed of the encoder temporal attention context vectors, the decoder intra-attention context vectors, and the first vectors; and
   generating the abstractive summary of the source textual document from the reference vector and the second vectors.

8. The method of claim 7, further comprising utilizing a novelty metric to encourage generation of novel phrases for inclusion in the abstractive summary.

9. The method of claim 7, further comprising utilizing a metric that measures word-overlap of the abstractive summary with a ground-truth summary for the source textual document.

10. The method of claim 7, further comprising:
    prior to the language model of the decoder generating the second vectors, training the language model using a CNN/Daily Mail dataset.

11. The method of claim 7, wherein the abstractive summary comprises at least one word from the fixed vocabulary.

12. A non-transitory machine readable medium having stored thereon instructions for performing a method comprising machine executable code which when executed by at least one machine, causes the machine to:
    generate, at an encoder, an encoding and an encoder temporal attention vectors for a source textual document;
    generate, using a contextual model of a decoder and the encodings, a decoder intra-attention context vectors and first vectors for extracting words from the source textual document;
    generate, using a language model of the decoder that is separate from the contextual model, second vectors for composing paraphrases of selected words in the source textual document from a fixed vocabulary;
    generate a reference vector composed of the encoder temporal attention vectors, the decoder intra-attention context vectors, and the first vectors; and
    generate an abstractive summary of the source textual document from the reference vector and the second vectors.

13. The non-transitory machine readable medium of claim 12, further storing instructions which when executed by the at least one machine cause the machine to utilize a novelty metric to encourage generation of novel phrases for inclusion in the abstractive summary.

14. The non-transitory machine readable medium of claim 12, further storing instructions which when executed by the at least one machine cause the machine to utilize a metric that measures word-overlap of the abstractive summary with a ground-truth summary for the source textual document.

15. The non-transitory machine readable medium of claim 12, storing instructions which when executed by the at least one machine, cause the machine to train the language model of the decoder using a CNN/Daily Mail dataset.

16. The non-transitory machine readable medium of claim 12, wherein the abstractive summary includes at least one word from the fixed vocabulary.

* * * * *